April 14, 1931.                H. HEUSER                    1,800,940
              PRODUCING BEVERAGES OF REDUCED ALCOHOL CONTENT
                         Filed Jan. 26, 1928
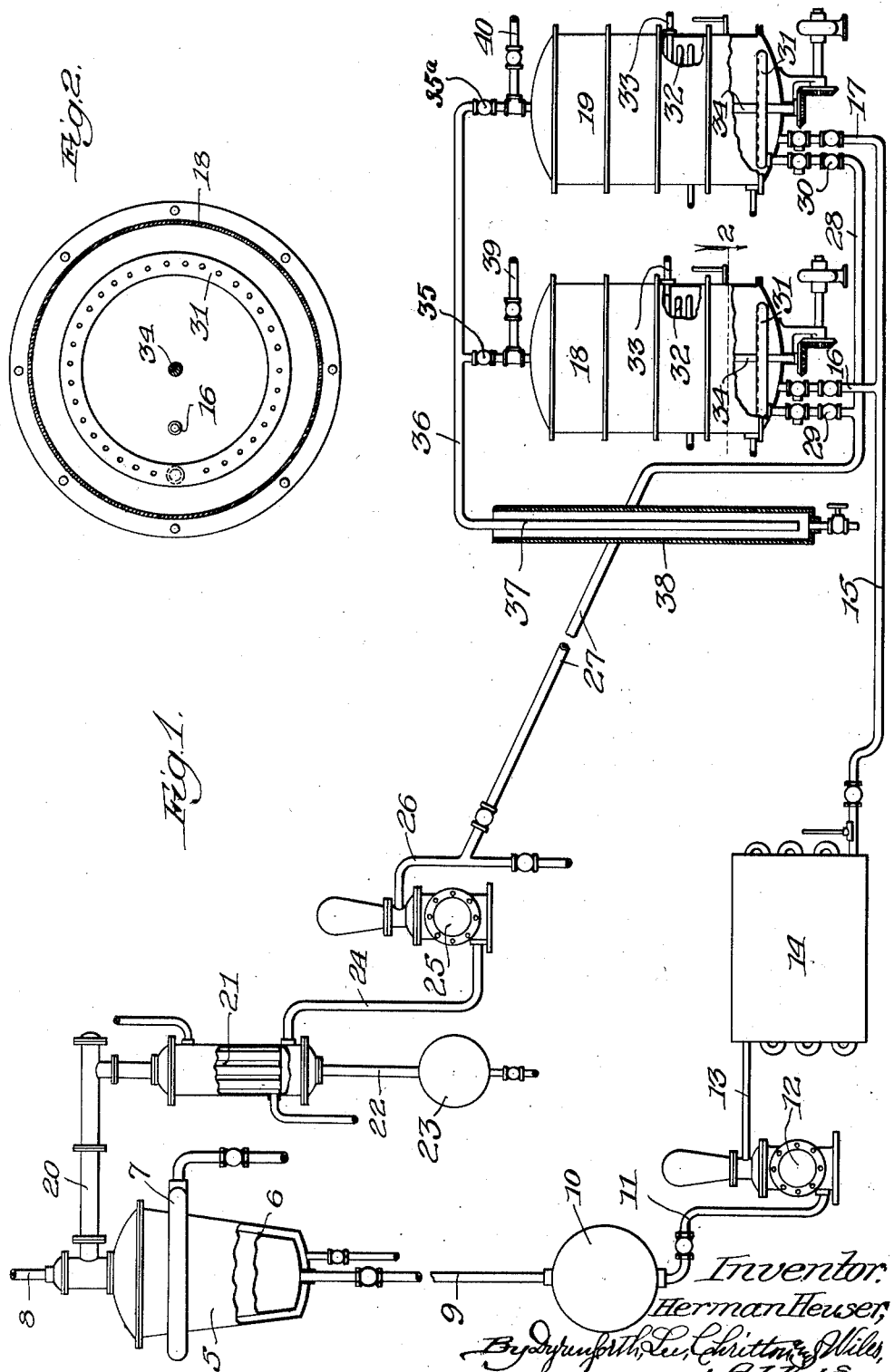

Patented Apr. 14, 1931

1,800,940

UNITED STATES PATENT OFFICE

HERMAN HEUSER, OF CHICAGO, ILLINOIS

PRODUCING BEVERAGES OF REDUCED ALCOHOL CONTENT

Application filed January 26, 1928. Serial No. 249,637.

The present invention relates to improvements in the manufacture of fermented beverages of reduced alcoholic content and more particularly to such beverages derived from the fermentation of cereal worts. As will be noted hereinafter, however, the process of the present invention may also be employed in the treatment of unfermented and fermented beverages and fruit juices of other types.

The invention will be fully understood from the following description, illustrated by the accompanying drawing, in which:

Figure 1 is a diagrammatic view partly in section, illustrating a suitable arrangement of apparatus for carrying out the present invention; and Fig. 2 is a sectional view on the line 2 of Fig. 1.

Referring more particularly to the drawing, the numeral 5 indicates an evaporator, which may suitably be of the shell type, for example, as shown in my Patents 1,277,931 and 1,500,618, granted September 3, 1918, and July 8, 1924, respectively. The evaporator 5 is provided with a jacket 6, to which the heating medium such as steam may be supplied from the manifold 7, as shown more particularly in my prior patents previously referred to. The fermented beverage to be treated, which, for the purpose of illustration may be said to be beer, is supplied to the evaporator suitably through an axial pipe 8, being distributed preferably in film form upon the internal walls of the evaporator. In flowing down the walls of the evaporator, the beer is heated and certain of its constituents are driven off, particularly the carbon dioxide, aroma-containing vapors and alcoholic vapors. The unvaporized residue, which is substantially alcohol-free or very low in alcohol, is discharged through the line 9, which is preferably of suitable length to serve as a barometric column, into the receiver 10, from which it is picked up through line 11 by pump 12 and discharged through line 13 into and through the cooler 14. The cooled dealcoholized residue then passes through line 15 and may be discharged through either valve line 16 or 17 into collecting tank 18 or 19 as desired, for treatment as will be hereinafter more fully pointed out.

The vapors from the evaporator 5 pass out through the line 20 to the tubular condenser 21. The temperature of the tubular condenser is controlled to effect condensation of the alcohol contained in vapors discharged from the evaporator, together with any water and other materials simultaneously condensed. This condensate is discharged through the line 22 to the receiver 23. The uncondensed vapors are drawn off through the line 24 to the intake of the vacuum pump 25, which is operated as a dry vacuum pump and maintains a substantial vacuum, suitably of 20 inches or greater, (corresponding to an absolute pressure of about 5 lbs. per square inch) upon the evaporator 5 and condenser 21. The vapor constituents drawn off by the pump 25 are discharged by it at a pressure at least atmospheric and preferably somewhat above atmospheric through the line 26, and the valve line 27 to the manifold 28. From the manifold 28 the vapors may be caused to enter the collecting receptacles 18 or 19 through the valved lines 29 or 30 respectively.

The discharge lines 29 and 30 by which the vapor constituents drawn off from the condenser 21 enter the tanks 18 or 19 each terminates within its respective tank in a perforated ring pipe 31, in the lower portion of the tank. Each tank is likewise provided internally with a cooling coil 32 to which brine or other suitable cooling medium is supplied by means of a pipe 33. Each of the tanks is likewise provided with suitable stirring mechanism 34.

In carrying out the present invention, for example, upon a fermented beverage liquid of the type of beer, the beer is supplied continuously through the pipe 8 to the evaporator 5, in which its volatile constituents, including the alcohol, are removed. These volatile constituents include, in addition to the carbon dioxide gas in solution, the constituents more volatile than alcohol which imparts to the beverage to a very substantial degree its distinctive flavor and bouquet.

The residue, which is substantially free from alcohol, is discharged through the barometric column 9 to the receiver 10, to be picked up and forced by the pump 12 through the cooler 14 and it is discharged through the line 15 into either one of the tanks 18 or 19, in which a substantial body of the dealcoholized liquid is caused to accumulate, say 100 barrels or more. At the same time, the aromatic and gaseous constituents which are being driven off from the evaporator 5 are caused to enter a previously accumulated body of dealcoholized residue contained in the other of the two tanks, as will be hereinafter more fully described.

The operation of the evaporator 5 is carried out under a substantial vacuum, say 20 inches or more, produced by the dry vacuum pump 25. The vapors and gases given off from the beverage undergoing treatment in the evaporator 5 pass through the vapor line 20 into the condenser 21, which is cooled sufficiently to effectively condense the alcohol contained in the vapors, together with such water and other products of higher boiling point than the alcohol as are condensed therewith. This alcoholic condensate is discharged through the line 22 into the receiver 23, its further disposition not being involved in the present process.

The uncondensed vapors, which contain the distinctive aromatic constituents driven off from the beverage, together with the dissolved carbon dioxide gas, are drawn through the pipe 24 into the intake of the dry vacuum pump 25 and discharged through the lines 26 and 27 under a pressure at least atmospheric and preferably moderately above atmospheric into a previously accumulated batch of cooled, dealcoholized residue in one of the tanks 18 or 19. Ordinarily, during the period that residue is accumulating in one of the tanks, say the tank 19, the vapors and aromatic constituents will be discharged into a previously accumulated batch of residue in the other tank 18. In entering the tank, the aromatic constituents and gas are distributed by the perforated ring pipe 13 at the lower portion of the tank and further cooling means, such as the coil 32 is provided in each tank in order to maintain the temperature of its contents suitably low, for example, at about 37° F. notwithstanding the heat of absorption of the vapors and such heat as may be imparted to the vapors and gases by compression by the pump 25. In operation, the additional cooling means are not always required.

The tanks 18 and 19 respectively are vented through the valved lines 35 and 35ª to the manifold 36, which leads to the extending pipe 37 extending to the bottom of a water column 38. The latter serves to control the pressure maintained upon either of the tanks 18 or 19 and also serves as a safety vent.

Valved pipes 39 and 40 are also connected by suitable means to the outlet lines 35 and 35ª, so that either tank 18 or 19 may be vented to the atmosphere, if desired.

The tanks 18 or 19 into which vapors and aromatic constituents are discharged for absorption is preferably maintained under a slight superatmospheric pressure, say about 4 lbs., thus increasing the effectiveness of the absorption of the aromatic constituents and likewise preventing foaming. The effectiveness of absorption may also be increased by the operation of the mechanical stirrer provided in each of the tanks. By operating in the manner described, I am able to secure a more complete and effective incorporation of the distinctive aroma producing vapors and volatile constituents of the beverage into the dealcoholized liquid than has hitherto been possible.

If desired, the dealcoholized liquid containing the absorbed aromatic constituents derived from the dealcoholizing process, may be subjected to further treatment, for example, it may be treated by the method of limited after fermentation described in my Reissue Patent No. 14,889, reissued June 22, 1920.

It is readily apparent that the method of the present invention may be applied to other fermented beverage materials than those derived from cereal worts; for example, it may be applied to fermented or unfermented fruit juices, to the concentration of fruit juices, ciders, and other liquids where a more or less volatile constituent is to be removed and other more volatile constituents containing aromatic or bouquet-giving constituents are desired to be preserved in the final dealcoholized or concentrated product. It is likewise to be understood that, although the present invention has been described in connection with the operation of a continuous form of evaporator, the initial evaporation or concentration or dealcoholizing of the material treated may be effected by other means, and that it may be batchwise, as well as continuous.

Although the invention has been described above in connection with the collection of the aroma-containing vapors in a body of cooled liquid, as the dealcoholized liquid, it is to be understood that the aroma-containing vapors, discharged from pump 25 through line 26 at increased pressure (at least atmospheric) may be passed into or through a cooled zone in which they are condensed and collected, for addition as desired to dealcoholized or other liquid.

I claim:

1. The method of producing a dealcoholized fermented beverage containing the aromatic constituents of the original beverage which comprises heating the fermented stock under reduced pressure to a temperature sufficient to remove alcohol therefrom together with more volatile constituents as vapors, subjecting the removed alcoholic and other vapors to cooling sufficient to condense the alcohol contained therein, compressing the uncondensed aroma containing vapors, and discharging said compressed aroma-containing vapors into cooled dealcoholized residue from the stock treated while maintaining upon said residue at least atmospheric pressure.

2. The method of producing a treated beverage liquid containing alcohol and aromatic constituents characteristic of said liquid prior to its treatment which comprises subjecting the beverage stock to heat under reduced pressure, thereby vaporizing and removing from said stock in vapor form the aromatic constituents, together with heavier constituents including alcohol, subjecting the resulting vapors while under reduced pressure to cooling action sufficient to condense therefrom the heavier vapor constituents, compressing the aroma-containing vapors and forcing the compressed aroma-containing vapors into a body of cooled, treated stock while maintaining at least atmospheric pressure on the latter.

3. The method of producing a dealcoholized fermented beverage containing the aromatic constituents of the original beverage which comprises flowing the fermented stock under reduced pressure to a heating zone in which it is heated to drive off alcohol and aroma-containing constituents in vapor form, cooling the dealcoholized residue and accumulating a body thereof, separating the vapors driven off from the stock in the heated zone, cooling said vapors to condense the alcohol contents thereof, separating the cooled aroma-containing uncondensed vapors and forcing the latter through the body of accumulated cooled residue while maintaining at least atmospheric pressure upon the latter.

4. The method of producing dealcoholized beer which comprises heating beer to drive off the alcohol contained therein together with aroma-containing vapors while maintaining reduced pressure thereupon, cooling the dealcoholized residue, separately cooling the vapors driven off from the beer sufficiently to condense the alcohol constituents thereof while maintaining reduced pressure thereupon, separating the cooled uncondensed aroma-containing vapors, and forcing the latter into a body of the cooled dealcoholized residue while maintaining a pressure at least equal to atmospheric thereupon.

5. The method of producing dealcoholized beer which comprises heating beer to drive off the alcohol contained therein together with aroma-containing vapors while maintaining reduced pressure thereupon, cooling the dealcoholized residue, separately cooling the vapors driven off from the beer sufficiently to condense the alcohol constituents thereof while maintaining reduced pressure thereupon, separating the cooled uncondensed aroma-containing vapors, and forcing the latter into a body of the cooled dealcoholized residue while maintaining a pressure at least equal to atmospheric thereupon, and producing a limited alcoholic fermentation in said residue.

6. The method of producing a dealcoholized beer which comprises flowing beer continuously through a heated zone maintained under substantially reduced pressure in which the beer is heated sufficiently to drive off its alcohol together with aroma-containing vapors, cooling the dealcoholized beer and accumulating a body thereof, removing and condensing the vapors driven off from the beer in the heating zone sufficient to condense the alcohol contained therein, separating the uncondensed aroma-containing vapors, compressing said vapors and forcing them into the body of cooled dealcoholized residue while maintaining at least atmospheric pressure thereupon.

7. In apparatus for producing dealcoholized fermented liquids, an evaporator, means for supplying stock thereto, means for withdrawing residue therefrom, means for cooling the discharged residue, a collecting tank in which a body of the cooled residue is accumulated, means for withdrawing vapor from the evaporator, a condenser through which said vapor is passed, and in which condensate and uncondensed aroma-containing vapor from the liquid are separated, a pump for withdrawing said uncondensed aroma-containing vapor, said pump being adapted to produce subatmospheric pressure in the evaporator and condenser, and means for discharging vapors from the pump into the body of accumulated residue.

8. The method of preserving volatile aroma producing constituents of an alcoholic liquid subjected to heat treatment under reduced pressure which comprises withdrawing the aroma-containing and alcoholic vapors given off from the liquid during said heat treatment, cooling the withdrawn vapors while under reduced pressure to condense the heavier and alcoholic constituents thereof, separating the resulting condensate from the uncondensed aroma-containing vapors, compressing the latter to at least atmospheric pressure and cooling them while under such compression.

9. The method of preserving volatile aroma producing constituents of an alcoholic liquid subjected to heat treatment under reduced pressure which comprises withdrawing the aroma-containing and alcoholic vapors given off from the liquid during said heat treatment, cooling the withdrawn vapors while under reduced pressure to condense the heavier and alcoholic constituents thereof, separating the resulting condensate from the uncondensed aroma-containing vapors, compressing the latter to at least atmospheric pressure and cooling them in the presence of an absorbing liquid while under such compression.

HERMAN HEUSER.